(12) United States Patent
Ellinghaus (10) Patent No.: US 7,913,953 B2
(45) Date of Patent: Mar. 29, 2011

(54) SOLAR SAIL LAUNCH SYSTEM AND SOLAR SAIL ATTITUDE CONTROL SYSTEM

(76) Inventor: Frank Werner Ellinghaus, Berlin (DE)

( * ) Notice: Subject to any disclaimer, the term of this patent is extended or adjusted under 35 U.S.C. 154(b) by 154 days.

(21) Appl. No.: 11/614,081

(22) Filed: Dec. 21, 2006

(65) Prior Publication Data

US 2008/0217482 A1   Sep. 11, 2008

(30) Foreign Application Priority Data

Dec. 28, 2005 (DE) .......................... 10 2005 062 841

(51) Int. Cl.
*B64C 1/10* (2006.01)
(52) U.S. Cl. .................. 244/159.6; 244/168; 244/172.6
(58) Field of Classification Search ............ 244/158.1, 244/159.6, 159.5, 168, 171.5, 172.6; 343/915
See application file for complete search history.

(56) References Cited

U.S. PATENT DOCUMENTS

| | | | | |
|---|---|---|---|---|
| 3,423,755 A * | 1/1969 | Ward et al. | ..................... | 343/705 |
| 3,459,391 A * | 8/1969 | Haynos | ....................... | 244/172.7 |
| 3,635,425 A * | 1/1972 | Swet | ........................ | 244/172.7 |
| 3,845,921 A * | 11/1974 | Thompson et al. | ........ | 244/172.6 |
| 4,591,116 A * | 5/1986 | Guenther et al. | ............. | 244/168 |
| 4,614,319 A * | 9/1986 | Drexler | ............. | 244/171.5 |
| 5,299,764 A * | 4/1994 | Scott | ....................... | 244/172.5 |
| 6,768,582 B1* | 7/2004 | Hachkowski et al. | ........ | 359/399 |
| 2005/0103940 A1* | 5/2005 | Bischof et al. | ................ | 244/161 |
| 2005/0274849 A1* | 12/2005 | Klosner et al. | ............. | 244/171.5 |
| 2006/0011783 A1* | 1/2006 | Bang et al. | ..................... | 244/168 |

* cited by examiner

*Primary Examiner* — Tien Dinh
*Assistant Examiner* — Michael Kreiner (57) ABSTRACT

Fuel less ACS for solar sails, using furl- and unfurl able ballast-sail-foil-segments for simultaneously displacement of center of mass and center of solar radiation pressure into opposite directions to each other.

Solar-Sail-Launch-System for direct launch of the System-Sail including already docked in daughter units and payload in the sailcraft's central docking station.

Unlike todays launch able solar sail designs the System-Sail features ample solar cell arrays and additional SEP-thruster-units for steering and propulsion, while the solar sail rather serves for longtime fuel less attitude controls and station keeping.

The SEP-Sailcraft may also serve as a carrier-ship for daughter-units in asteroid exploration missions and is able to deliver prospector landers back to LEO with furled in foils.

12 Claims, 6 Drawing Sheets

SOLAR SAIL LAUNCH SYSTEM AND SOLAR SAIL ATTITUDE CONTROL SYSTEM

REFERENCE TO RELATED APPLICATIONS

Priority Claim

This application is based upon and claims the benefit of priority of the co-pending German Patent Application No. 10 2005 062 841.9, filed on Dec. 28, 2005. The disclosure of which is expressly incorporated by reference herein.

Related Applications of the Inventor

DE 102 34 902 B4, DE 102 004 004 543 A1, DE 10 2005 028 3780. This actual patent application has also been filed in the U.K. and became patented under GB 2434 345 B and under DE 10 2005 028 378 in. Germany.

Other Related Applications

U.S. Pat. No. 4,426,052 A, US 20020116877 A1, US 2006/001783, US 2005/0274849, US 2005/0103940, U.S. Pat. No. 5,299,764, EP 1280228 A2, EP 0524888 A1, WO 1990/006259 A1, RU 002101811C1, RU 002053941 C1.

Related Papers

Pryor, Wie et al., "Development of a Lightweight Pulsed Plasma Thruster Module for Solar Sail Attitude Control", 18. Annual AIAA/USU Conference on Small Satellites.

Wie, Murphy at al. "Robust Attitude Control Systems Design for Solar Sail Spacecraft".

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

MATERIAL SUBMITTED ON A COMPACT-DISC

Not Applicable

BACKGROUND OF THE INVENTION

1. Field of the Invention

This invention relates to the design and composition of spacecraft to implement a complete space mission like asteroid-sample-return to LEO or satellite-missions, using a launcher and a mothership solar sail spacecraft, which deploys in space and one or better more daughter-unit(s) which are already docked at launch. Especially it relates to the direct launch of a solar-sail mothership-spacecraft and at launch time already docked daughter units and the deployment of the solar sail foils in space.

The invention also relates to steering, station keeping and attitude control of this special solar-sail mothership spacecraft through implementing an Attitude Control System (ACS) and—besides thruster steering—with additional solar-electric-propulsion thrusters features an improved "Roller-Reefing" System as means to move the spacecraft's center of solar radiation pressure (cf) and center of mass (cm) relative to each other. The ACS is further supplemented through the cm movement of docked daughter units and payload inside the docking and payload station of the mothership.

2. Description of the Related Art

Figure 4:
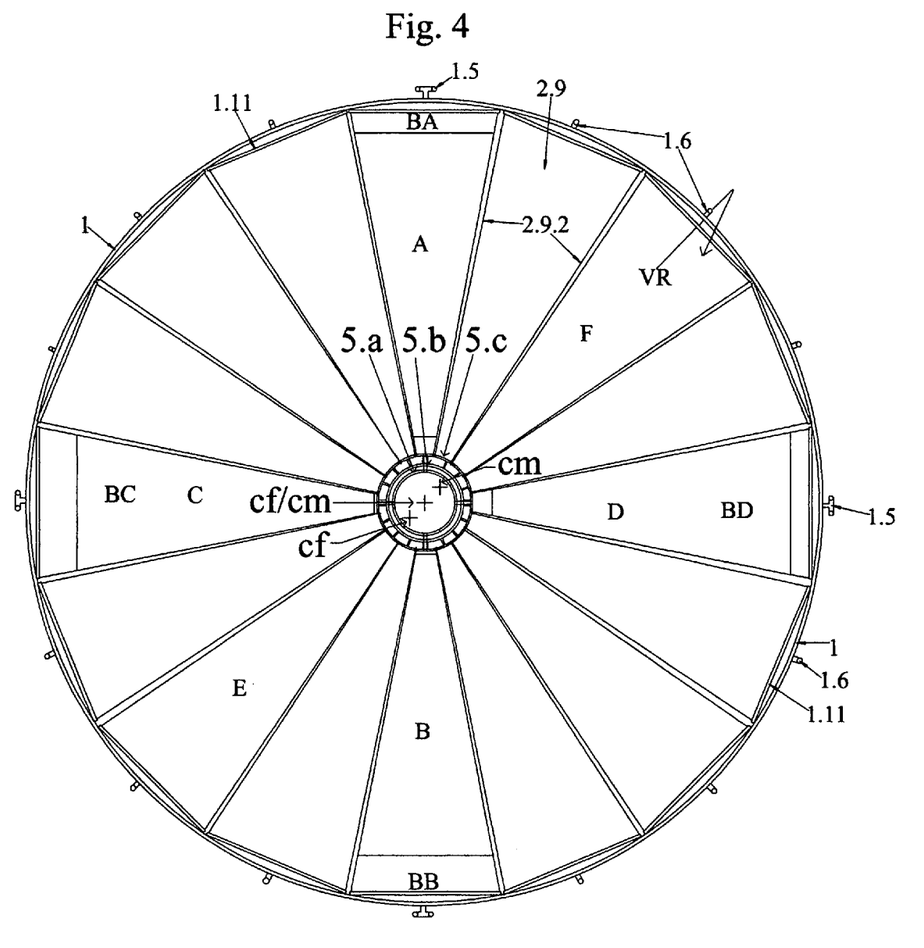
FIG. 4 is a prior art design of a large space mounted solar sail mothership. It shows a thruster-ring with solar sail foils and in this case the newly invented four steering sail-foil-pathways A, B, C and D, equipped with four ballast-foils BA, BB, BC and BD on their ends.

Known are solar sail mothership-spacecraft designs of the inventor as shown in FIG. 4 (Thruster-Solar-Sails, see DE 102 34 902 B4, DE 102 004 004 543 A1), which feature a magazine docking- and payload-station to carry several docked daughter units (like landers, communication and observation satellites, flying container units) and additional means to handle further payload.

The stiff Outer(pipe)-Ring of those (Thruster-)RingCraft carries (low thrust) double thruster units on the outer edge. Inside the ring circle are solar sails, the docking and payload station with docked daughter units, solar cell arrays, etc. attached to the Outer-Ring.

As the double-thruster units are arranged in complementing pairs, the solar sailcraft has an additional means of propulsion, steering and attitude control.

Further prior art is the "Inner-Ring-Construction" also an invention of the author of this application, (DE 10 2005 028 3780) for Thruster-Solar-Sails, which is consisting of the above mentioned docking- and payload-station which is surrounded halfway upwards through further rings.

Attached to that flat ring layer around the central docking- and payload station can be solar-cell arrays and other devices like payload fuel-, thruster-units and winch-devices for roller reefing.

One further patent of the inventor is the "roller reefing appliance" of the spacecraft (DE 10 2005 028 3780), which is characterized through the solar sail being split into several sail foils which are furled onto rolls; said rolls being held in holding devices on an Outer-Ring of the solar sail.

The sail-foil path ways can be pulled out (set) through winches which are located at a Inner-Ring-Construction while furling (reefing) them happens with the help of motors on the rolls.

The Telescope Brackets 5.12, which can be Described also as Telescoping Masts

BRIEF SUMMARY OF THE INVENTION

The mentioned prior art designs as shown in FIG. 4 are thought for in space construction of very large solar sail spacecraft. This current invention shall allow the direct launch of a deployable solar sail mothership spacecraft which combines all the above described capabilities (docking and payload station for several daughter units, roller reefing and aditional SEP-propulsion) of space mounted large solar sail spacecraft but doesn't need further in space construction.

In space deploying solar-sail spacecraft are already known, but they provide neither roller-reefing nor the docking station for daughter units and it's additional payload handling capability. The combination of those features with additional SEP-propulsion in one self deploying solar sail spacecraft with the help of a special launcher and the way of deployment through the launcher with pivoting petal segments of the payload compartment and rotatable platform is the main novelty of this invention.

Also is the existing basic roller-reefing design improved against material fatigue of the steering foils which have to be furled and unfurled often and also for better steering/attitude control, which is an additional aim of this present application.

BRIEF DESCRIPTION OF THE DRAWINGS

The spacecraft skeleton is a construction of connected rings which forms a cylindrical volume and is used as the central docking- and payload-station and a further plurality of connected rings around the docking station for the attachment of gear, thruster units, solar cells and telescope brackets 5.12., carry the sail foil rolls 5.13 on their tips, tilted upwards for launch.

Thruster units are pairs of two thrusters mounted opposite to each other in a common jet tube.

Solar/accessories modules 5.14 and thruster modules 5.15 are attached to the inner-ring-construction 5.

FIG. 3.*a*—shows the sail foil roll 5.13 on a roll holder 5.13.2 with turning motors 5.13.1 and 5.13.2. This motor combination with the special holder enables not only roller-reefing but also turning the sail panel which is prior art for other solar-sail designs, but is new to a roller reefing appliance.

FIG. 3.*b* shows the telescope brackets 5.12 hinged to the Inner Ring 5.*c* of the Inner-Ring-Construction 5.

FIGS. 3.*c*.1-3.*c*.3 show examples of possible profiles for several telescope bracket segments 5.12.3, sticked into/around each other.

FIG. 3.*d* is a drawing of the locking devices which prevent the segments 5.12.3 to slide back when the telescope brackets 5.12 are expanded and pulling forces of the roller-reefing appliance are applied.

It strives also to show, that the adverse movement of the center of solar radiation force (cf) and center of mass (cm) add to each other and enhance the leverage of this steering system.

DETAILED DESCRIPTION OF THE INVENTION

Integrated Prior Art

As it is the scope of this invention to implement essential parts of the inventors prior art previously thought for large space mounted spacecraft into a direct launch able solar sail spacecraft, those prior art items, which are also applied to this application, shall be explained underneath. However the inventor emphasizes, that special adaptations have been designed, which allow to integrate ALL of those features together into one single spacecraft AND deploys in space.

Docking- and Payload-Station—German patent appl. DE 10 2004 004 543 consisting of one or more Inner Rings which are connected among one another and stretched or hang into the center of the Solar Sail spacecraft.

To dock several daughter units and payload, movable docking brackets and winches are attached to the station, which allow to take in and hold daughter unit spacecraft and payload.

Inner-Ring-Construction (DE 10 2005 028 3780)

The Inner-Ring-Construction for Thruster-Solar-Sails is consisting of the above mentioned Docking- and Payload-Station which is surrounded halfway upwards through further rings, which form a flat layer around the Docking- and Payload-Station.

Attached to that layer around the central docking- and payload station can be solar cell arrays and other devices like payload, fuel- and thruster units, steerage- and feedback control units, communication and measurement devices, and also winches for the subsequent explained roller reefing appliance of the spacecraft.

Figure 1:
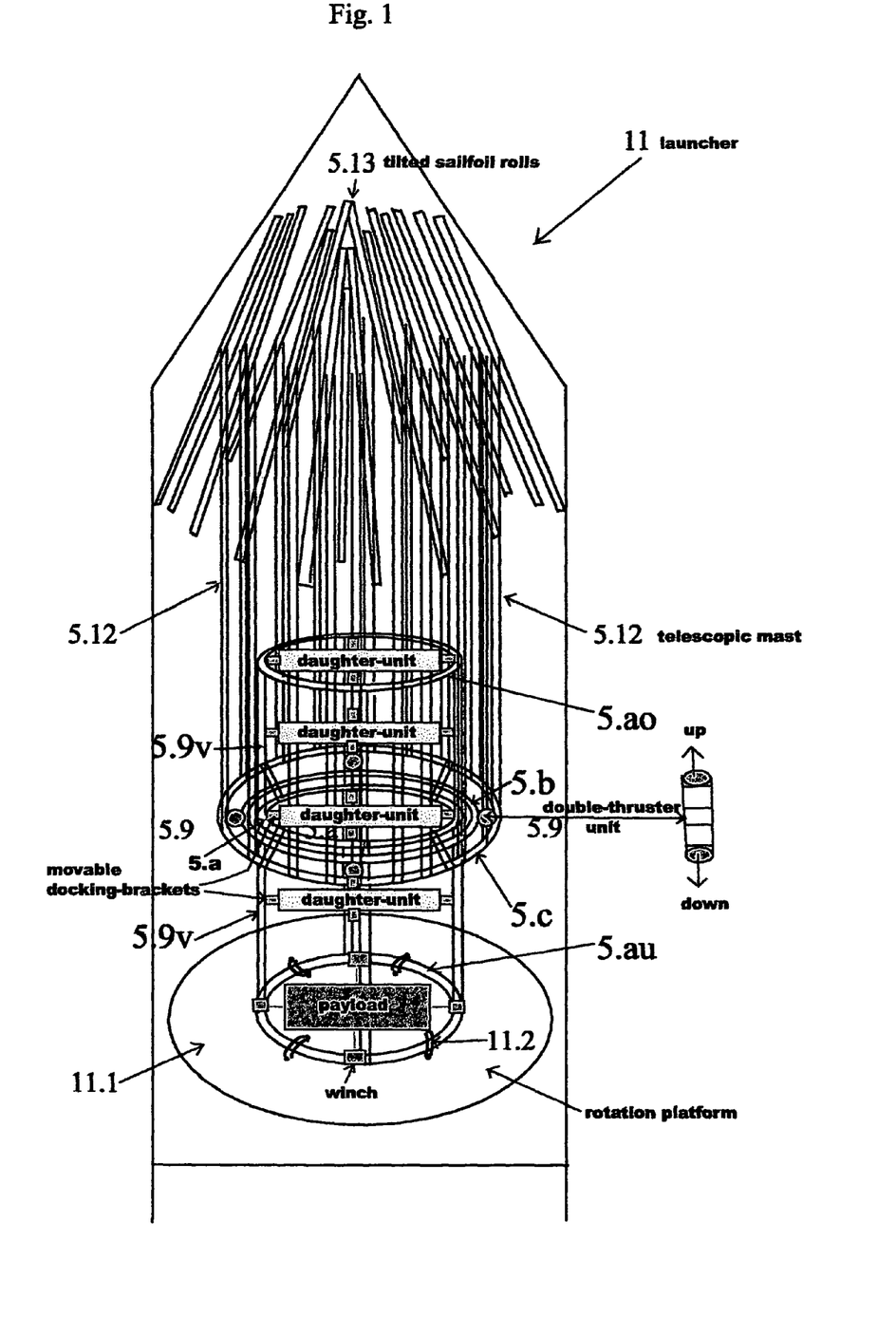
FIG. 1—the solar sail mothership spacecraft insides the launcher in stowed position on a rotation platform with docked daughter units held by movable docking brackets inside its central docking station.
Figure 2:
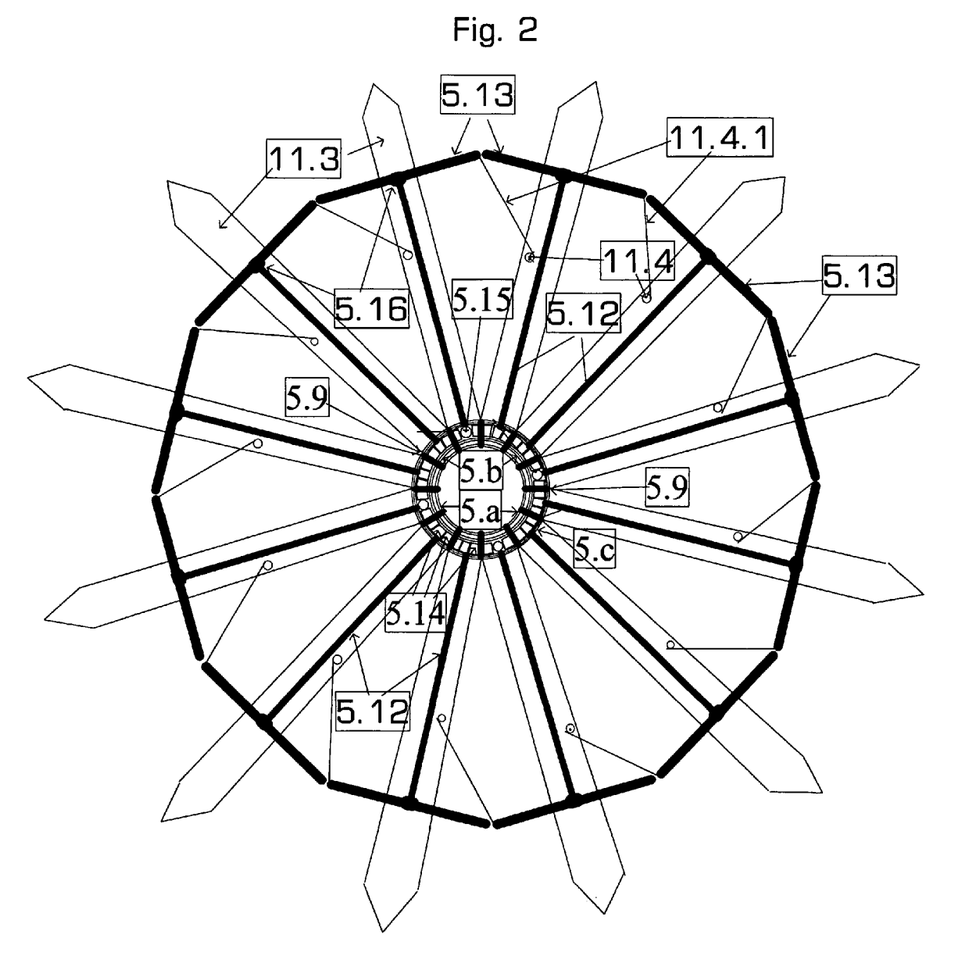
FIG. 2—shows the solar sail mothership spacecraft after launch and after the launcher payload compartment has opened up like a flower in several tilt able launcher hull segments 11.3. Those segments have pulled the telescope brackets 5.12 with the sail foil rolls 5.13 into their tilted position. The brackets would be expanded now to their full length by rotating the craft with the launcher's rotation platform 11.1.

The difference of the Inner-Ring-Construction in this application is, that the construction is not attached to an outer ring skeleton any more through belts or ropes, but that it became the main carrying structure of the spacecraft itself, which deploys with tiltable telescopic masts and sail foil rolls attached to the mast tips, shown in FIGS. 1 and 2.

"Roller reefing appliance" (DE 10 2005 028 3780) is characterized through the solar sail being split into several sail foils, which are furled onto rolls; said rolls being held in holding devices on the Outer-Ring of the Thruster-Solar-Sail. Those sail-foil path ways can be pulled out (set) through winches, which are located at the Inner-Ring-Construction while furling (reefing) them happens with the help of electric motors at the rolls.

Figure 3:
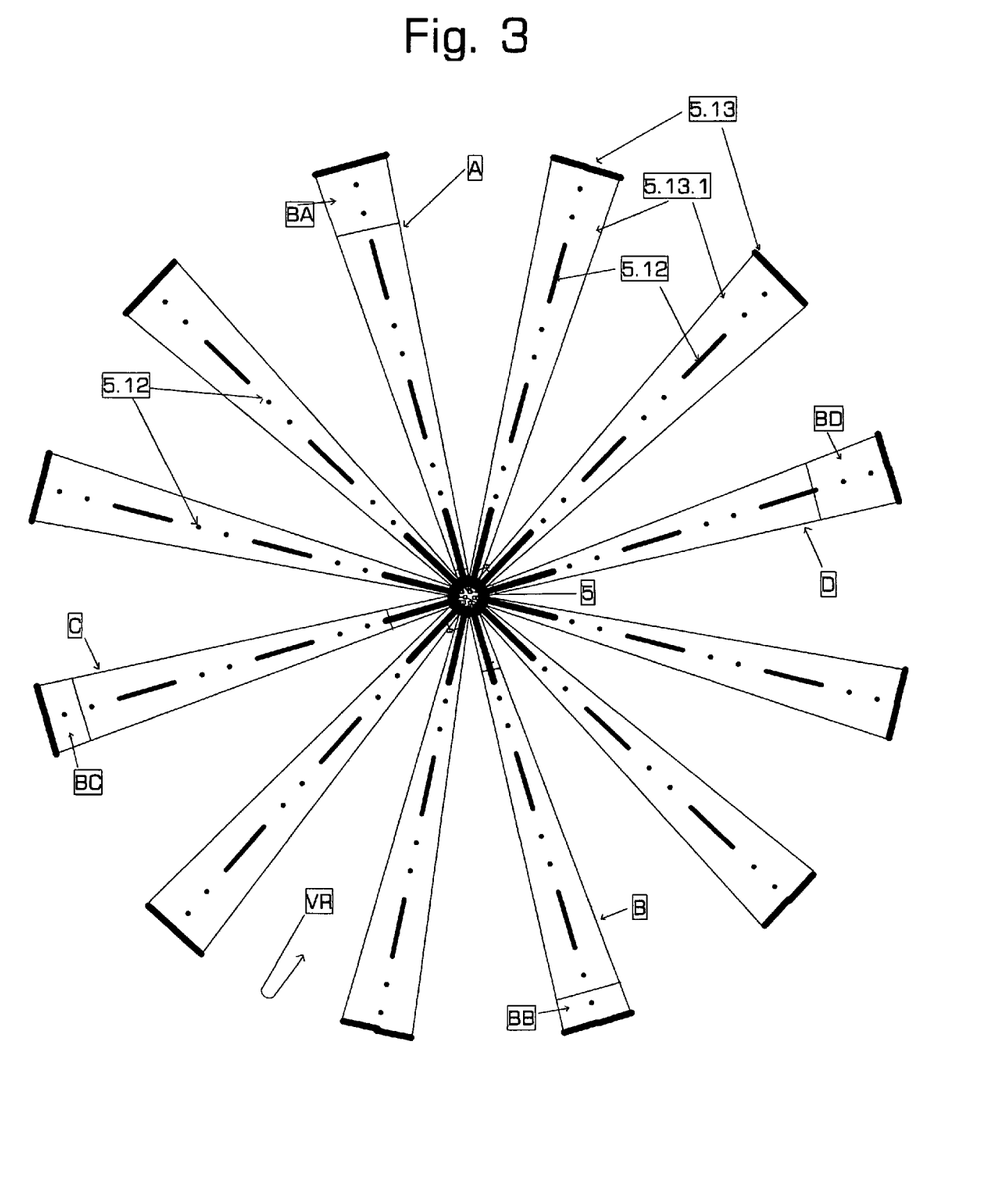
FIG. 3—shows the solar sail mothership spacecraft after expanding and separation from the launcher and the equipment with steering-foils which have ballast foils, as in FIG. 4.

In this application the appliance is improved through the ballast foils, which enable better longevity for the sail foils and better ballast leverage through roller-reefing. A further improvement for roller-reefing is the special Roll-holder shown in FIG. 3. with the roll-motor 5.13.1, which allows to add a windmill-like function to roller reefing and gives the craft the possibility, to turn around it's central pole.

Double Thruster Units combined with solar cell arrays on solar sail spacecraft—(DE 102 34 902 B4, DE 102004004543).

The solar-electric double thruster units shown on FIG. 1, which enable the craft to slow down, stop or reverse each acceleration or turn initiated through the thrusters, are not new to solar sail spacecraft.

New in this present application is the additional implementation to a self deploying solar sail spacecraft with the additional properties of roller-reefing and several possibilities of mass movement which allows mission designers to choose between several complementing attitude-control and steering options.

Necessity of the Present Application

On his homepage solar-thruster-sailor.info the inventor has published his previous solar sail designs regarding large space mounted spacecraft in part shortly after patent application and has also brought this to the attention of solar sail experts.

Because robot and astronaut labor in space is extremely limited and costly, out of this circle of experts came the proposal to develop a solar sail based on the previous designs which does not has to be mounted in space. The difficulties of material fatigue associated with frequent furling and unfurling of the extremely thin and delicate sail foils have also been emphasized.

Those arguments cannot be dismissed. Subsequently in part A) an advanced version of the sail setting and roller reefing arrangement of the previous application (DE 10 2005 028 3780) will be introduced. It allows steering the solar sail craft without having to furl or unfurl the delicate solar sail foil.

Under part B), a Solar Sail Launch System is developed, which should allow launching a solar sail completely without further mounting tasks in space. It is opulently equipped with a docking station and solar cell arrays.

The solar sail mothership spacecraft should be also equipped from start with a roller reefing arrangement and with daughter units (observation and communication satellites, asteroid or comet landers, dock able add-on thruster units) already docked.

Due to the low gravitation on asteroids and comets, it would be possible with low thrust daughter units to return samples to Earth orbit at low cost, needing just one single launcher start.

Such preferred Near-Sun mining missions to asteroids would presumably be orders of magnitude more cost effective than similar missions to the Moon, as those would have to be completed in much higher gravity conditions with a lot less Sun-energy available hence not allowing equipment that is as light and cheap.

Chapter A)

Solar-Sail-Mothership-Spacecraft Improved by a Complementary Attitude Control System (ACS)

Assignment of the ACS according to A) is to make completely fuelless attitude control possible for a solar sail with a stiff Outer Ring.

Also to complete and improve existing fuel less ACS for solar sails regarding application and effects. That applies for very large solar sails which have to be assembled in space as well as for the self expanding solar sails as described in the following chapter B). Additionally, the effectiveness of the sail setting and reefing arrangement shall be improved.

Like a sail boat, a solar sail has two virtual centers, which have to be balanced to prevent unwanted turns, which send the boat into wrong directions or have to be counteracted. If a sail boat is to sail straight forward it must be pointed to the wind in such a way that the sail's center of wind pressure is at the same level as the reverse interacting center of water pressure on keel and boat hull.

Every necessary steering maneuver with the rudder at the boat's stern decelerates the sailboat's speed.

A well balanced boat is in principle faster than an unbalanced one, as unnecessary decelerating steering activities can be avoided.

On one hand, the solar sail as a spacecraft does not depend on the whims of an earth like wind, as it can bank on a very steady stream of Sun pressure which always comes from one direction.

On the other hand, it is situated in a three dimensional space where it can turn into any three dimensional direction.

That is not always desired, as the sail has to be adjusted to the Sun to achieve the most possible acceleration.

Control is further complicated by gravitational forces as those of Earth, which have to be factored in also. Attitude control of a solar sail can occur through shifting the center of mass as well as shifting the center of radiation pressure forces. Unwanted turns should not happen if those centers coincide, though that would not often be the case.

Unwanted torsion forces from shifted force centers arise on other space crafts also and are called "thrust vector misalignment problem".

Without counter measures this would lead to a solar sail turning away from the best possible orientation to the Sun. In the worst case it could neither be steered in a sufficient manner nor driven into the direction desired. On the other hand shifting of masses could be used to steer a solar sail without using fuel.

The simplest method of fuel less attitude control and steering using radiation pressure forces is to attach additional movable steering areas (vanes) which can be adjusted for force pressure manipulation.

This concept was published several years ago for a 4 square kilometer square solar sail, which would serve as supply vehicle in Mars exploration.

Other vane designs may be found in "Solar Sailing, Technology, Dynamics and Mission Applications" by Colin McInnes. (first edition, pages 99 to 101).

However, vane steering has it's disadvantages too. In abnormal steering situations it could happen, that vanes don't work, such as when Sun pressure is parallel to the sail foils of the solar sail and of the vanes as well.

One solution would be to mount those vanes not only movable, but also folding. On self-deploying square solar sails with self-expanding masts, complications can be expected. Will those masts be solid enough after deployment to carry vanes on their ends and to support steering maneuvers without twisting or kinking?

Another fuel-less steering option is shifting the sail's center of mass by shifting weights. Those moving weights could be inside the sailing area as well as on the sail craft's rim.

Those kinds of steering options are available for the inventor's Thruster-Solar-Sail design also, as the stiff Outer Ring and Inner-Ring-Constructions provide ample possibilities for secure mounting of adequate appliances.

In the (German *annotation of translator) patent application DE 10 2005 028 3780 of Jun. 16, 2005 the inventor introduced one more steering possibility to improve his designs, which is not only useful for steering of the solar sail but does allow sail setting and reefing in space (see FIG. 1 of that application).

This sail setting and reefing arrangement allows the rolling of sail foils onto and off rolls which are fixed to the rim of the solar sail. The main advantage, however is that a very large solar sail can be separated into a lot of smaller sail foil panels.

This allows easier handling and mounting of large sails whereby mounting is done including the rolls. On a solar sail craft with fully set sail, a sail foil spans from Outer Ring to Inner Ring, and every sail foil has a corresponding twin on the other side.

If a foil is furled (reefed) the sail area on this side of the sail is reduced compared to it's twin, which is still fully unfurled. At the same time, the center of mass of the furled sail foil is shifted to its outer edge.

A benefit of this kind of attitude control/steerage is that both, the center of solar pressure and center of mass, are shifted into the opposite directions. Both center shifts add to each other by enlarging or reducing of the leverage between the centers.

If center of mass and center of solar pressure are separate and shall be shifted toward each other this can happen through furling on one side or unfurling on the other side. By adding the shift of both centers the steering procedure is quicker than with a steering method where only the center of mass is shifted or only the center of solar pressure is shifted.

Moving the centers apart again leads to an accelerated steerage also, because both changes of direction add to each other too and in this case increase the thrust vector. The farther the center of mass is located from the center of light pressure, the more extended is the leverage which allows the light pressure to turn the sail craft around its center of mass.

A disadvantage of steering a solar sail by roller reefing and unfurling is expected fatigue of the thin sail foil material.

This fatigue of material shall be limited substantially by improvements which will be described subsequently.

Fuel-less ACS of a Thruster-Solar-Sail through Roller Reefing

The basic principles have been explained with FIG. 1 of the already mentioned second follow-up patent-application. By furling and unfurling of sail foils center of mass as well as center of solar radiation pressure can be changed. The problem however is material fatigue due to frequently rolling the foil on and off which would damage the sail after some time.

This problem shall be solved for the steering part but unfortunately not for the part of frequent sail setting and reefing. However fatigue should not happen for a simple return mission were reefing the sail takes place only one time at the end of the mission.

Though it is to assume, that the sail foil will be stressed less even with several times of sail setting and reefing, than it is the case for the more stressing unfolding of a self unfolding solar sail with masts.

A possible solution seems pretty simple. If the sail foils are from the beginning on short enough, that they can get shifted without having to roll them, stress situations are completely avoided.

This could happen through placing short sail foils sufficiently distant to both sides of the Outer Ring of the sailcraft. To steer the craft, only the adequate foil would be moved into direction of the Outer Ring without furling it. As the foil tracks are shifted only, mechanic fatigue would not take place at all. This method has a drawback as well, which would still be acceptable. A part of the possible sail area is lost due to the shortened sail foil length.

There is another possibility, which reduces loss of sail area and in addition provides enhanced fuel-less steering capability. Only the part of a sail-foil which is located next to the sail-crafts Outer Ring could be manufactured strong enough, that it would be sufficient to avoid material fatigue for a long time.

The advantage is, that this part of the foil has higher mass which serves as ballast and can be used as center of mass changing device. Through the location of the ballast area near the sail-crafts edge lesser ballast mass is needed as with ballast weights which would be located near the crafts center.

To avoid undue mass increase, the number of ballast foils could be clearly less than the number of pure sail foils. The inventor prefers the usage of only four ballast foil areas which are located on sail foils in 90 grade distance before and after the next one.

With FIG. 3 a steering gear is shown on a self expanding solar sail, which can be mission ready launched directly from Earth. Control happens by furling and unfurling of ballast roll-sail-foils as shown in the following chapter B of this patent application.

FIG. 4 is showing a solar sail with "Roller-Reefing" too, featuring ballast sail-foils BA, BB, /BC, BD. In this case were the solar sail's potential size is much bigger, the sail-craft has to be mounted in space and features a stiff Outer Ring.

Besides being the main carrying structure, the thruster units (preferably ion thruster based) and the sail-foil-rolls are attached to it also. Contrary to the sail-setting and -reefing-arrangement of the last patent application ballast-sail-foils with their stronger construction allow more frequent furling and unfurling, whereby the higher mass near to the edge of the solar sail allows to shift the center of mass also.

Shifted is not only the center of mass but also the center of radiation pressure onto the sailing area and this into the desired opposite direction too. This distinguishes the hereby introduced steering/ACS-technique from the pure ballast shifting on solar sails with masts.

No doubt that unwanted rotational forces on a small solar sail are smaller also, but they increase on larger solar sails with the cubic of the size increase. On very large solar sails, it would be helpful, that additional to mass shifting another means of increasing the steering power is available.

This is in this case the shifting of the center of radiation pressure. The mode of operation (as shown in FIG. 4) of such an ACS shall be explained with an concrete example. In this case, it is assumed, that the solar radiation pressure hits exactly vertical onto the sailing area shown in the drawing.

According to FIG. 4 two mated steering sail-foils at a time (here A+B and C+D) are vertical located opposite to each other. The mated foils make it possible to reverse a steering force by using the foil on the opposite location (for instance to stop a rotation).

The steering foils are outfitted with ballast-steering-segments BA, BB, /BC and BD. The ideal initial state would be well balanced with center-of-mass as well as centre- of -solar-radiation-pressure accurately located in the center of the solar sail. Furling one foil would change balance and alignment of the centers which are marked as cf/cm in this case.

Center of mass as well as center-of-radiation pressure are moving into opposite directions when furling a foil. Unfurling that foil again will move the centers back to the initial state.

In the same manner as for mast sails which guide their ballast weights along the masts a two axle steerage is realized in the instance mentioned above.

The steering foils BA and BD are half unfurled while the steering foils BB and BC are still fully unfurled.

Hereby the center-of-mass (cm) displaces into the direction of the two fully unfurled foils and that proportionately to the degree of unfurling. Additionally the center of solar radiation pressure (cf) of the sail moves into the opposite direction.

The force of solar radiation pressure which is virtually concentrated onto cf pushes the solar sail in this case around cf. Seen from above the foil E is pushed downwards, on the opposite side the foil F is pushed upwards similar to a beam swing which is suspended on a bearing. This "center-offset" leads to a rotation.

The direction of the rotation can be shown through vectors which lie on a line through both center points to the solar sail craft's rim on both sides. From the end points the vectors are pointing upwards and downwards and should enable to outline and determine the rotation.

Through gradually different furling and unfurling of two adjacent foils the above mentioned "direction—line" can get moved almost at will between the foils. The rotational axle (DA) would lie in an 90-/180-grade angle to the direction-line and cut the center of mass (cm) if the solar sail is well balanced and no further forces are in action.

Unfastening the Individual Sail Foils

In the preceding application no. 10 2005 028 378.0 the individual sail foils have been laid on top or sidewards fixed to each other. Therefore roll-brackets which could be lowered have been needed. Because of this the mechanical properties steering/ACS would become over-complicated making it handicapped or nearly impossible.

Thus the inventor has revised the design again and believes that it would be better to let a small space between the sail foil tracks to enable independent furling and unfurling. Lowering or raising of the tracks would not be needed any longer. FIG. 1 to FIG. 3 of this application therefore features spaces between sail foils.

Fuel-less steerage/ACS through shifting payload: A possibility of fuel-less ACS, especially suited for Thruster-Ring-Spacecraft with an Outer Ring and with stiff Inner Ring docking-station, as featured in preceding applications, has been overlooked so far by the inventor.

With the first successor application the magazine-dock which features docking-brackets able to move into the central docking space has been invented.

As the docking brackets are move-able, it is obvious, to use them for moving the payload inside the docking space. That enables to change the center of mass as well, which allows as shown before, to use the cm-change for steering and attitude control. Together with the ACS through roller-reefing a solar sail would have two fuel-less attitude control possibilities at hand.

A Thruster-Ring-Spacecraft without a solar sail, (for instance the Mobile Power Station of the first follow-up application) could get steered fuel-less for the first time.

Chapter B:)

Solar-Sail-Launch-System, Consisting of a Launcher and a Self Expanding Solar Sail with Docking-Station and Primary, Fuel-Less Attitude Control and Steerage Problems: Though direct construction of a solar sail and even production of parts in space would be certainly optimal (for instance production of sail foils) the current robotic technique has not evolved sufficiently for those tasks or the needed development would be extremely expensive and long-winded.

Therefore some solar sails have already been in development, which can get launched directly off Earth whereby no further in space construction is needed. For instance also one construction by the German Air- and Space-Agency—DLR.

This sail-craft could theoretically carry a small payload, yet a docking-station were daughter units could dock in- and out, is absent. The possibility to get the craft back into atmospheric border conditions around Earth without having to fear that it is crashing down, is missing too.

For that, reefing the sail before getting into atmospheric border conditions should be possible. The reason for this need is, that the orbit speed of the solar sail (for instance near the ISS) with it's large sail area would get slowed down through atmospheric particles so much that crash down would be unavoidable.

Another problem of self deflating solar sails is that the sail foils have to be folded before launch and unfolded again when it has reached the place of action. At first the risk of failure is pretty high for unfolding solar sail foils. Additionally the sail foils would crease and could get damaged through this.

Out of this reason the sail foils thickness has to be selected accordingly, which leads to an unnecessary mass enhancement. The author of this paper does not know any sail design (apart of his own filed with the last application) with both, the option of return and the possibility of sail setting through unfurling.

However this design of the last application relates to very large space constructed systems with stiff carrying Outer Ring which is assembled from pipe segments. A design of such a sail, were space assembling is not needed, is not existent to the authors opinion.

Smaller solar sails which could be directly injected into an orbit located further outwards or even into a Sun orbit would help to avoid costs and loss of time related to the many orbit spirals needed to get out of the influence of Earths gravity. This could become the introduction in cheap utilization of space material resources.

At the beginning the first time return of materials and testing of extraction methods would be the main objective while mass extraction would be unimportant. The option to return extracted materials to a NEO-space-station would be very helpful for contamination-free research and application testing.

Purpose of the Solar-Sail-Launch-System

The Solar-Sail-Launch-System as discussed in part B) of this application is to direct-launch an operation-ready mounted solar sail spacecraft. This spacecraft would feature a sail-setting and -reefing arrangement, ample solar cell arrays, a docking-station and a primary fuel-less ACS and steerage. It would automatically expand with the help of the launcher and be use able without further space-mounting.

If the launcher is strong enough (for example the Ariane™ rocket),—not only the Earth atmospheric border but Earth orbit also could be directly deserted. This would shorten the duration of the mission substantially.

The solar sail would not need to spiral outwards off the Earth gravitation well in many agonizing lengthy orbits were the craft increases it's obit speed—like the European space probe Smart I has done. (Smart I needed one year to reach Moon orbit from Earth orbit, while the American astronauts needed only 3 days from start off Earth to landing on the Moon.) While doing this it should be possible also, to carry one or several ThrusterRing-Spacecrafts integrated as daughter-units inside the solar sail's docking station, which are particularly used for material extraction missions on asteroids.

Additionally return to a NEO-space station like the ISS for delivery of the extracted materials shall be possible without the danger that border atmospheric rest particles are forcing the craft to a crash down to Earth.

Fundamental Idea of the Invention

The concept deals with a self extracting solar sail based onto an Inner-Ring-Construction, were telescope brackets are folded upwards. They don't unfold outwards before the target position is reached. After unfolding, the telescope brackets spread out to their full length and the sail setting takes place through unfurling the sail foils of the sail foil rolls.

The term "self extracting" solar sail—in contrast to "self deploying" has been chosen to emphasize that neither folding nor unfolding of the sailing area is necessary despite the direct-launch off Earth.

Unlike the Thruster-Solar-Sails dealt with in the last application of the inventor which features a carrying Outer Ring structure with an Inner Ring mounted into it, the self extracting solar sail of the actual application is based onto an Inner Ring structure which carries the out-spreading telescope brackets with the sail foil rolls fastened to them.

Inside of the launcher the whole surface of the payload department is used for the Inner Ring construction shown in FIG. 1. The construction consists of the rings $5.a$, $5.b$ and $5.c$, which are located in the same plane, while the ring $5.o$ is located above and the ring 5.*u* under the level plane and fixed to the bottom of the launcher-payload-department onto a rotation able interface.

The launcher-payload-department is capable to open up automatically and assist the solar sail (out-spreading and extending of the telescope-brackets) during the extraction phase until releasing it.

The Inner-Ring-Construction, which serves as payload- and docking-station constitutes not only the supporting structure, were the telescope-brackets 5.12 for the sail-foil rolls are suspended; it carries also solar- and other payload modules as well as the thruster units.

The telescope-brackets 5.12 are stored segments inside segments, this means they are manifold shorter as in their fully out-drawn state. In several stages (First After Launch Stage, Second After Launch Stage, separation off the launcher) the solar sail enlarges it's size and separates off the launcher. This happens with the help of the launcher, respectively with devices fixed to the launcher which remain there after separation.

In the first After-Launch-Stage the launchers payload-department opens up in multiple segments which spread out the telescope bracket 5.12 of the solar sail sidewards of the Inner-Ring-Construction. In the Second After-Launch-Stage the telescope bracket tubes are pulled outwards (elongated) through suitable measures. Subsequently separation of sail-craft and launcher follows.

FIG. 2 shows the result of the First After-Launch-Stage. The solar sail is still located on the launcher. Although the telescope brackets of the solar sail are already spread out sidewards and the sail foil rolls are tilt and snapped into their operation ready position, the brackets have not yet pulled out to their full length.

FIG. 3 depicts the operation ready solar sail after elongation of the telescope brackets were the sailcraft is already separated off the launcher. The completion of the First-After-Launch-Stage leads to the first stage of enhancement which is shown in FIG. 2.

The completion of the Second-After-Launch-Stage leads to the second stage of enhancement of the solar sail. FIG. 3 shows the already separated solar sail in the second stage of enhancement, already in operation ready state and separated off the launcher.

First-After-Launch-Stage

In the First-After-Launch-Stage the top part of the launcher which encloses the payload compartment opens up in several segments, which tilt sidewards like blossoms. In the process the telescope brackets 5.12 of the solar sail get pulled sidewards also and spread away from the outermost middle ring of the Inner-Ring-Construction 5 until they lock into their place.

Then the sail-foil-rolls 5.13, which until up to this moment have been adapted to their location inside the launcher, get pulled outwards until they snap in also, pulled into their position through the electric winches 11.4, which are located at the launcher-hull-segments 11.3.

The separation of the winch-pulling twines from the solar sail could happen through predetermined braking points. This would be possible through enhancing the tractive force after lock in or through the following centrifugal forces when rotation takes place.

Second-After-Launch-Stage

The last instance of solar-sail expanding is pulling out the telescope pipe- or rail-segments to their full length. This can happen through rotational forces of a rotating disk which is mounted in the launcher (s. FIG. 1, 11.1), where the system sail is held with the mounting clamps 11.2.

Elongating the telescope brackets could alternatively take place also through worm gearing were the segments feature windings which help to push them away of the Inner-Ring-Construction 5. The rotation of the rotation-platform 11.1, which is the solar sails platform in the launcher, gets going through one or more electric motors, which are attached underneath.

The acceleration happens gently until to the point where all telescope-brackets (pipes) of the sailcraft are pulled out into place through the rotational forces. The rotation does not happen to the sail only, the launcher will rotate also into the opposite direction.

After elongation and locking in of all telescope brackets has taken place, the electric motor(s) decelerate slowly until the solar sail does not rotate any more. Now the sailcraft is ready for separation and sail setting.

Third-After-Launch-Phase—Separation off the launcher and sail The separation of the solar sail is enabled through unclasping the clutches, which remain in place and through accelerating away off the launcher. The clutches 11.2 (FIG. 1) could be released through winding out clutch-bolts which are located underneath the rotation-disk with the help of winding motors.

The sailcraft could use the own thrusters to accelerate away of the launcher. Another way to do this would be to release pre-compressed springs which would push the solar sail away. Subsequently the self deploying sailcraft could unfurl the sail-foils off their rolls into direction of the Inner-Ring-Construction and would be operation ready.

Out of clarity-reasons the pulling threads and winches of the sail foil tracks are not shown in the drawings, since they have been shown in the second follow-up patent application of the inventor and explicitly illustrated there (see FIG. 1 of that application).

Condition of the Tilted Solar Sail in the Launcher

FIG. 1 shows the self deploying solar sail in the payload compartment of the launcher-upper stage.

The solar sail is composed of the carrying, stiff Inner-Ring-Construction 5, which exploits the full floor space of the launcher and also of the telescope brackets which are attached to the Inner Ring and tilted upwards, carrying the sail foil-rolls at their ends.

The carrying structure encloses a cylindrical formed free space which is accessible from both ends and serves as the sailcraft's payload- and docking-station were the daughter-units can dock in and out from above and underneath. The Inner-Ring-Construction as the term indicates, is composed of several rings which comprise preferably lightweight pipe-materials.

They are connected together through the Inner-Ring-Joints 5.9 (as already invented in the previous patent application) to a stiff, but very light skeleton-structure. The 3 circular pipe bodies 5.*a*, 5.*u* and 5.*o* span the docking-space volume while the two rings 5.*b* and 5.*c*, which are located around the ring 5.*a* serve to take on further equipment and rig. All rings are connected firmly together through the joints 5.9 and 5.9*v*.

As all of the payload volume is used up and no change of the Inner-Ring-Construction is necessary through the deployment, it is possible and should be done to dock in and install daughter units and equipment in a ready for use state.

With the help of to the Inner-Ring structure attached docking brackets which are not shown here, the daughter units are held safely inside the sailcraft. For this purpose the brackets move into the docking space while they move outwards when they have to unblock the gateway for take off of daughter units. As those brackets are move able, the sailcraft can principally steer through mass displacement too, when moving the docked in daughter units. Also the attachment of winch-devices for payload handling to the pipe skeleton of the docking-station is possible.

The rings 5.b and 5.c which are adjacent to the ring 5.a in the middle zone of the docking-cylinder, serve to hold several different modules, particularly solar cell arrays, gauging instruments and control devices, thruster- and fuel-modules. Fixed to the outermost Inner-Ring 5.c are also the telescope brackets 5.12 of the sail foil rolls 5.13 which are held through pivoting/roll hinges.

On the top-end of the telescope-brackets 5.12 are holding mechanisms located which are tilt able like windscreen wipers. Those mechanisms are not shown in the drawing. They allow to carry the sail foil rolls 5.13 in a tilted state when launching. Structure and winding of those foil roll are shown in FIGS. 2 and 3 of the last patent application.

To take care of the launcher mountings during acceleration at take off, they could get additional support through CNT-cables fixed to the launcher-hull above, which pull upwards.

First Stage of Expanding as Shown in FIG. 2

FIG. 2 shows the solar sail spread outwards, yet attached to the opened up launcher upper stage. The launcher is equipped at the payload compartment with a hull which is able to open up through tilting outwards. For every telescope bracket which tilts outwards like a spoke exists one single tilt able launcher hull segment.

The hull-segments have opened up after the craft has reached the point of action. At the same time they have pulled out the telescope brackets 5.12 until they have locked into place while spreading horizontally sidewards. The roll-tilting mechanism 5.16 of the sail rolls 5.13 has already been tilted with the help of winches 11.4 which are attached to the launcher. They have locked in and are parallel to the disk plane (90 grade to the telescope brackets).

Advantageously is, that the mechanisms which help to spread out, separate or pull are attached to the launcher. That saves unnecessary mass at the solar sail.

Second Stage of Expanding

This stage is reached, when the telescope brackets of the self enhancing solar sail are fully drawn out to their full length, for instance through rotation. A drawing of this stage is not shown.

Last stage, operation-ready solar sail with unfurled sail foils, shown in FIG. 3 In the last stage the solar sail has enlarged considerably (manifold) through extending the telescope brackets compared to the straddled out state of the first stage shown in FIG. 2.

While the sailcraft's contour looks nearly like a polygon in FIG. 2, it looks like a blossom with leaves staying far away of each other. The telescope brackets 5.12 are indicated slightly, but normally are not visible from above, as they are blanketed through the sail foils.

The self deploying solar sail, could perform missions, which are not available for actual solar sail designs of self unfolding sailcrafts.

The ample equipment with solar cell arrays as power supply and the secondary fuel less ACS through the sail-setting and -reefing arrangement enable longtime missions, while the additional thruster-steering and -ACS provides maneuvering capability in extreme situations, for instance in border atmospheric influence zones.

Likewise the data transmission capacity, which depends on the energy at hand, will profit of the abundant solar cell arrays.

The solar sail will be able, to take in several daughter units, which fulfil different tasks. In particular sampling and material collecting on asteroids and returning the materials to a LEO-space-station.

Admittedly the sailcraft has one serious disadvantage. The mass/thrust-relation especially when using aluminum as structural material, is very poor. That applies also when compared to self-unfolding mast sails which need only 4 masts compared to the 12 telescope brackets shown in this design.

As the self unfolding masts will also be a lot lighter per meter as the stiff brackets, the difference would be considerably. The inventor hopes, that the usage of lighter, very strong materials, allows to reduce circumference and thickness of the pipes or telescope rails compared to aluminum.

Nevertheless, even an aluminum solar sail would have it merits. It could serve as proof of concept for steering and ACS through roller-reefing for larger solar sails with thruster ring whose mass/thrust ratio improves with growing size.

Additionally it could make up time through direct injection into a Sun-orbit in the beginning of the operation compared to the ThrusterRing-sailcraft. Compared to the self unfolding mast sail it shows more versatile usability (like a docking station for daughter units, ample solar cell arrays, the possibility to get back to atmospheric border regions near Earth).

Considerations on Size and Construction Type of the Self Deploying Solar Sail

The stiff base structure of the solar sail takes advantage of the full launcher-compartment floor space.

The Ariane V ECA™ has a diameter of about 4.57 m. This would allow a diameter of the solar sail's Inner Ring structure of about 4.50 m.

Consequently plenty of room for instance to place a 1.2 m wide belt around the central docking station with solar cell arrays, thruster- tank- and equipment-modules (like control-, photo-/film-, gouging-, receiver- and transmitter-units).

Altogether about 12.4 $m^2$ area would be available for this solar-cell and equipment belt. Further 3.5 $m^2$ area would be available for the docking station which could take in daughter units with about 3 $m^2$ area. The volume capacity of all disk- or pill-like daughter units with a diameter of about 2 m would be limited through the volume of the docking station. The inventor calculates with a maximal height of all docked in daughter units of 8 m.

The volume of the solar sails docking station with about 26.5 $m^3$ available alone for payload and daughter units is quite respectable. Additional available is the area of 12.4 $m^2$ (located in between the rings 5.b and 5.c), were additive solar cells, payload and thruster units could be attached on both sides.

In contrast to this, known designs of self unfolding solar sails feature sparse payload volume, no solar cell arrays and certainly no docking station for daughter units. Admittedly those advantages are restricted through the disadvantage of the self deploying solar sail's much higher mass.

Nevertheless missions could be considered, which are first time enabled with the help of the self deploying solar sail; as for instance asteroid exploration with material extraction and return of it to a LEO-space-station.

The extent of enlargement (and with it sailing area and thrust of the solar sail propulsion) depends on the number of bracket segments and on their length. Those again depend on material thickness, height of the launcher payload compartment and the maximal tolerable mass of the brackets, which probably account for the biggest mass share of the spacecraft (besides the payload).

As an example telescope brackets with altogether 7 telescoped extend able segments are presumed. Each segment could be 10 m long. When 20 cm would intersect the full length of a telescope bracket would amount to 68.80 m.

The diameter of the fully enlarged sailcraft would amount to 142.20 m (2×68,80 m plus 4.50 m diameter of the Inner-Ring-Construction. If the solar sail would feature 12 sail-foil rolls and a width of 6 m each, where the unfurled area of one single roll would amount to 260 m$^2$, the total area would be 3.120 m$^2$. In this case the solar sail propulsion would develop 28 mN of thrust at Earth level.

Compared to this a 40-m square sail with 1600 m$^2$ would achieve about half of the thrust of the sail above. SMART I, the European space probe which reached Moon orbit from Earth orbit in a year, has achieved again more than double of the self expanding solar sail's thrust (70 mN).

This performance does not look impressive at all, considered, that the self expanding solar sail will show considerably more mass as the mast sail and cannot orientate the sail-thrust as good as SMART I can when using the ion drives. Each of the 12 telescope brackets would be probably clearly heavier than the four masts of the mast sail.

Also the acceleration of the mast sail per mass-unit would be better than those of the self deploying solar sail. However, the self deploying sailcraft can get additional propulsion through the launcher or through using it's own built in ion-drives or through an additional thruster which is docked in into the docking station.

The sailcraft would use the sail propulsion not necessarily to reach the destination, instead it would use it for fuel less steering and station keeping, which enables long duration missions.

Returning to Earth—orbit by only using the solar sail propulsion would also be possible if needed, whereas the last leg of the journey has to be done again with the ion-thrusters and reefed sail.

Before a really large solar sail is built using in space construction, such a sail above with at least two docking able daughter units could serve to study the reactions of such a kind of steering and propulsion means relative cost-efficient. The daughter units would dock out taking pictures and filming the maneuvers. They would transfer the data to Earth and afterwards dock in again to recharge their power packs with the help of the mother ships power supply.

At least one of the daughter units would perform the documentation while the other (broadcast) unit would be directed to Earth and transfer the photo and film data.

The broadcast unit could be also connected to the mother ship through a power cable but would be directed to Earth independent of the mother ships attitude. Through this a sufficient power level which enables high transmission power with enough bandwidth would be ensured because the mother ships solar cell arrays would be directed to the Sun while at the same time directing the broadcast unit to Earth is also possible.

Fuel-Less Rotational Attitude Control Around the Pole of the Solar Sail

In the paper "Development of a Lightweight Pulsed Thruster Module for Solar Sail Attitude Control" the authors suppose that the Sun's radiation pressure will lead to a rotation of the solar sail around it's pole.

The inventor does not see, why in his own design rotation should happen. But he wants to add a fuel less possibility to steer rotation around the pole of the disk, that means to avoid or even to accelerate rotation for stabilisation purposes. Otherwise if a unwanted rotational force based on prolonged Sun radiation pressure would occur momentum could build up which imparts fly wheel like properties to the sailcraft.

The stabilization of direction (for instance for dum-dum bullets) is often desired, on the other hand it would considerably complicate steering as well as optical observation from a sailcraft which is constantly rotating.

The solar sail in this design is (contrary to the Thruster-Solar-Sail) not able to avoid rotation with the help of thrusters because accordingly directed thrusters don't exist in this case. There are only thruster pairs available which point upwards and downwards. In FIG. 2 the sail foil rolls 5.13 are fixed to the telescope brackets 5.12 in a 90 grade angle. The normal position of the sail foil pathways in this case would be level to the sail disk.

If the telescope brackets would be turnable mounted, either around their pole or at the sail foil roll at it's hinges using motor control to turn the rolls to another angle than 0 grade to the disk, a propeller like shape of the sail foil would develop. This shape could like a wind-driven propeller initiate or decelerate pole rotation.

FIG. 3.*a* shows such a sail foil roll 5.13, which can be turned around the pole of the telescope bracket 5.12 through turn motor 5.13.1, while turn motors 5.13.3 allow rotation around the pole of the roll itself.

PREFERRED EMBODIMENT OF A SELF DEPLOYING SOLAR SAIL

The preferred self deploying solar sail design of the inventor would feature a payload- and docking-station as already mentioned. It would be also equipped with several means of propulsion and ACS.

Those are
a) the solar sail propulsion
b) propulsion through the ion-drives located between the rings 5.*b* and 5.*c*
c) optional docking of additional thruster units in the docking station
d) steerage/ACS through furling and unfurling the sail foils e) steerage/ACS through turning the sail foils
f) steerage/ACS through displacement of payload and daughter units in the payload and docking station
g) steerage/ACS through the ion drive units Besides the solar sail propulsion at least 4 double-thruster units (5.15 see FIG. 2) each 90 grade away of their neighbors, or even 8 double—thruster complete units each in 45 grade distance to each other attached between the rings 5.*b* and 5.*c*, would be mounted.

This double thruster units have been already proposed with the first patent application DE 102 34 902 B4 of the inventor. They distinguish themselves through an arrangement of two thrusters, which are mounted in the same jet tube. The directions of the thruster jets when firing are opposite to each other.

That leads to the possibility, that every turn or acceleration which have been caused by a thruster-combination can be decelerated or even reversed through reversing the direction of thrust.

If all of the thruster units shown in FIG. 2 fire in the same direction, the sailcraft is accelerated upwards or downwards when seen from it's plane. If regular ion thrusters are used like the same one used by SMART I, the craft would produce 300 mN of thrust (compared to the 28 mN of the solar sail propulsion).

It would have four times the thrust level of SMART I and more than 10 times the level of the additional sail propulsion. Because of the generous configuration with space for energy production and supply, using those four thruster units all at once is possible also.

In missions were the point of service has to be reached fast, the ion propulsion is the first choice while the sail-propulsion might be used as support additionally. The solar sail is rather thought to enable longtime service on the point of service or orbit.

In conjunction with a strong launcher, which accelerates to Earth orbit escape velocity, the poor sailing thrust of the sailcraft is unimportant. As an example may serve an observation satellite operating in a near Sun orbit.

This satellite could not only observe the Sun and their storms, it could watch Earth vicinity also for a long time.

To the opinion of the inventor, much closer placement to the Sun will enable finding a considerable number of near Sun asteroids. Spotting them from Earth into direction to Sun is more difficult than spotting asteroids which are more far away from the Sun as Earth but could be seen better because of their reflections.

DETAILED DESCRIPTION OF THE DRAWINGS

FIG. 1—State at launch shows the self-expanding solar sail, in upward tilted state inside the launcher. The Inner-Ring structure 5 in form of a stiff pipe construction consists of 3 pipe rings 5.*a* to 5.*c*, which are located in the same plane, and ring 5.*ao* above as well as ring 5.*au* under ring 5.*a*.

They frame a cylinder like space, which is accessible for daughter units from above and underneath. All rings are connected through connecting pieces 5.9. The daughter units will be held by docking clamps (not shown in this drawing but in FIGS. 5-7) which can move into and out again of the dock. Different types of daughter units which are also not shown, can and should be docked in already at the time of launch. Their design would be determined through the specific mission.

For instance lander for exploration missions, flying containers for transports, satellites for orbit injection serving as observation units, mobile docking able thruster units for additional acceleration of the solar sail.

To the outermost Inner Ring 5.*c* are the telescope sail roll brackets 5.12 hinged attached and tilted upwards. On the other ends of the brackets are the sail foil rolls 5.13 located which are also hinged attached and tilted for optimal space utilization of the launcher hull.

The sailcraft is fastened with the clamps 11.2 on it's lowest ring to the rotation platform 11.1.

FIG. 2—after opening up, sail roll brackets tilted sidewards shows the solar sail and the underlying tilt able hull segments of the launcher payload compartment after launch in the first expansion phase (sidewards tilted telescope brackets 5.12).

Each of the tilt able hull segments 11.3 of the open up able launcher upper stage have tilted sidewards like blossoms and in the same process tilted the telescope-brackets 5.12 with the sail foil rolls 5.13 also. The sail foils are not set yet and are furled on their foil rolls 5.13.

The sail foil rolls 5.13 which have been tilted upward during launch, have now been pulled through winches 11.4 and winch strings 11.4.1 into their operation-ready position (90 grade to the telescope brackets) were they have snapped in.

After un-tilting, the strings have to be removed through suitable measures, like predetermined breaking points, which rupture when enhancing pulling forces. The docking construction 5 comprises besides the central docking potential in the Inner Ring 5.*a* between the middle and outer Inner Rings 5.*b* and 5.*c* as well solar cell arrays, as also modules for steerage, observation and miscellaneous. Those modules are fixed onto the ring pipes through comprising clamps which are backed through additional splints with lock nuts.

That strengthens the stability of the Inner-Ring-Construction 5 additionally. The desirable elongation of the payload station up- and downwards for inclusion of a plurality of daughter-/additional thruster-units is not shown here.

FIG. 3—Solar Sail after expanding—ready for action shows the self expanding solar sail after the expanding process has happened and detached of the launcher. The telescope brackets 5.12 are fully extended, the sail foils 5.13.1 are unfurled of their foil rolls 5.13 through Inner Ring mounted winches which are not shown here.

The sail foils 5.13.1 cover the telescope brackets 5.12 which normally would not be seen from above, hence they are drawn with points and strokes. The particular segments of the pipe- or rail-formed telescope-brackets 5.12 are extended out to their full length.

The principal structure of the winch-facilities for sail-setting and -reefing and of the sail foil pathways has been introduced with the last application DE 10 2005 062 841.9 of Jun. 16, 2005. New in this case is only the usage on a self-expanding solar sail with telescope-brackets and tilt able joints and the usage of ballast-steering foil segments (here BA, BB, BC, BD) for steerage and attitude control.

The primary steerage of the sailcraft is done through furling and unfurling of the ballast foil segments, were center of mass and center of solar radiation pressure can be displaced each opposite to the other (into the direction or away of each other).

In the drawing the ballast-steering-segments BB and BC are compared to their respective partner modules on the other side of the sailcraft furled to the half of their effective area. This causes displacement of the sailcrafts center of mass away from it's center into direction to the border where BB and BC are located.

As the sail foil area of the sail foil pathways B and C diminishes, the center of solar radiation pressure displaces in this case towards the sail foil pathways A and D which are fully unfurled. While the effect of both furled in ballast-steering-segments combines, a rotation starts. Since a big part of the ballast-mass is furled onto the outermost possible location (on the sail foil roll) the center of mass is displaced into direction BB and BC.

While the center of solar radiation pressure between the pathways displaces into the opposite direction towards the ballast segments BA and BD, the lever (distance) between both pathways is displacing also.

The longer force-vector resulting out of the fully unfurled foils A and D plus the additional sail foil area on the same side of the (displaced) center of mass are pushing the weaker smaller force of the sail foil area on the other side of the center of mass upwards like a beam swing. This results to rotation, which can be steered not only in their acceleration but also in their direction. (Through furling one of both furled in steering foils more than the other).

As long as the solar sail is not exactly aligned parallel to the direction of Sun radiation or located in shadow regions a primary fuel less steerage/ACS should be possible with the help of steering foils.

However in situations of calamity or exception, steering as well as additional propulsion through the thruster modules 5.14 shown in FIG. 2 is possible.

FIG. 3.*a*—Sail Foil Rolls 5.13 with Turning Motors

The sail foil rolls 5.13 are held on their hubs from the sides through the roll mountings 5.13.2 which are attached to the turning motors 5.13.3. The outwards located rotors of the turning motors are fixed to the roll body and hence turn with it for steering furling and unfurling of the sail foil rolls.

Whereas the turning motor 5.13.1 is located on the outermost end of the telescope bracket 5.12 and serves for turning the sail foil path itself, which enables to control the rotation of the sailcraft around it's pole. Alternatively the turning motor 5.13.1 could be attached to the other end of the telescope brackets 5.12 at the Inner-Ring-Construction 5. Underneath of the turning motor 5.13.1 is a hinged tilt able joint 5.12.1, which enables tilting the sail foil rolls during launch inside the launcher.

FIG. 3.*b*—Telescope Bracket with Hinged Joint on the Outermost Inner Ring 5.*c*

The telescope brackets 5.12 are mounted with a turnable joint 5.12.2 at the Inner Ring 5.*c* to enable tilting them upwards while they are located in the launcher. The turnable joint 5.12.2 enfolds the pipe body of the Inner Ring completely and is held with holding bail 5.12.2.1 in place. The ring curvature is offset at this place through corresponding bulges, to provide a straight pipe outer surface After tilting the telescope brackets sidewards, they push down onto the bracket support 5.12.2.2 which spans around the bracket from underneath to support it.

FIGS. 3.*c*.1-3.*c*.3—different segment profiles sticked into one another side by side three possible profile types are shown, with their openings on one side. The into one another sticked segments, which get thinner each time, can be seen.

The left rectangular profile 3.*c*.1 is on it's left side equipped with dentition, were an electric motor with gear wheel or camshaft, which is attached to the end of the first segment, could put on to push further segments outward. The drawings in the middle (3.*c*.2) and to the right (3.*c*.3) are thought for segment pull out through rotational forces (using the to the launcher attached rotating platform). Additionally they are equipped with security devices against pulling back of the fully drawn out telescope brackets (shown in FIG. 3.*d*).

The shape in the middle (FIG. 3.*c*.2)—of a six-sided polygon—is the preferred embodiment of the inventor, because it is a good compromise between the mass saving of a round variation and the twist-safety of angular forms. A round variation would be also possible but would need complicated guide ways.

FIG. 3.*d*—Locking Devices of the Telescope-segments

The telescope brackets 5.12 comprise of several segments 5.12.3.

When pulling out the telescope segments, all of them with exception of the first (outermost) one have to be secured in their working position to avoid that they get pulled back again for instance while using the winches.

The drawing shows the joint section of two nested segments 5.12.3 in the working position, here the end of the intaking segment and the beginning of the next one which is nested in the intaking segment.

The allocated locking device in this case consists of the locking sleeve 5.12.4, which is incorporated into the inner segment 5.12.3. The locking sleeve 5.12.4 takes in two locking pins 5.12.4.1 which are pushed outwards opposite to each other through the locking holes of the intaking segment with the help of locking springs 5.12.4.2 as soon as the working position is reached.

The working position is reached when the ball bearing guide way 5.12.4.3 of the inner segment impinges against the pull out lock 5.12.4.4 of the outer intaking segment. To facilitate the extension process, the nested in segment carries two ball bearing guide ways 5.12.4.3. Though nesting without ball bearings should be possible also, using an own pull out lock for the inner segment.

FIG. 4—Thruster-Ring-Solar-Sail with Primary Steerage and Attitude Control (ACS) through "Roller Reefing"

FIG. 4 pictures a Thruster-Ring-Solar-Sail, therefore a sailcraft with stiff Outer Ring which carries low thrust propulsion units for steerage and ACS attached to the ring.

This solar sail features a central docking station and ample solar cell arrays, as well and not least as a primary fuel less steerage/ACS (besides thruster steerage).

The solar sail is based on the Thruster-Solar-Sail design of the inventors former patent applications, except of the following specifics:

The single sail foil path ways are not fastened to each other, instead each one is separate and freely steer able processing from the Outer Ring to the Inner Ring structure. This means that each foil furls and unfurls freely contrary to the last application, were they would have to be lifted up- or downwards or held in two different plains.

Several of the sail foil pathways feature ballast foils (here BA, BB, BC and BD) which serve to steer the sailcraft. In the drawing the ballast foils BA and BD which are drawn in halfway, displace the sailcrafts center of mass (cm) and the center of solar radiation pressure (cf) also.

This produces a rotation of the solar sail around an axle which cuts cm. In this case the craft will be turned upwards into direction VR of the sail foil F, when seen from above. Whereas the part on the opposite side of the axle will be pushed downwards. They are construed in a way, (thicker, eventually with stronger material), that they are able to endure frequent furling and unfurling without or with only few fatigue of material. This enhanced mass of the foils is used now for steering the solar sail through mass displacement of cm and cf.

Both centers can be moved away or towards each other, which produces angular momentum driving cf around cm. Also foils which are not provided with ballast segments could be furled and unfurled, for instance to avoid to much means of attack for atmospheric influence on the boarder to Earth.

LIST OF REFERENCE SIGNS

Reference signs for FIG. 1

11=launcher
11.1=rotation platform
11.2=rotation-holding-clamp
5=Inner-Ring-Construction
5.*a*=innermost Inner Ring
5.*b*=middle Inner Ring
5.*c*=outermost Inner Ring
5.*a.o*=upper Inner Ring
5.*au*=under Inner Ring
5.9=Inner Ring joint sidewards
5.9*v*=Inner Ring joint volume
5.12=telescope brackets
5.13=sail foil rolls Reference Signs for FIG. 2

11.3=tilt able launcher hull segments
11.4=sail roll pulling winch
11.4.1=winch cable
5=Inner-Ring-Construction
5.a=innermost Inner Ring
5.b=middle Inner Ring
5.c=outermost Inner Ring
5.ao=upper Inner Ring
5.au=under Inner Ring
5.9=Inner Ring joint sidewards
5.9.v=Inner Ring joint volume
5.12=telescope brackets
5.13=sail foil rolls
5.14=solar-cell/accessories modules
5.15=double thruster units
5.16=roll tilt joint Reference Signs for FIG. 3 sail foil path ways are denoted with letters, here A, B, C and D. The ballast-steering foil segments of the sail foil path ways are denoted with the letter B and a second added letter, here BA, BB, BC and BD.

VR=vector of rotation respectively direction of turn
5=Inner-Ring-Construction (docking station with additional modules)
5.12=telescope brackets
5.13=sail foil rolls
5.13.1=sail foil path ways Reference Signs for FIG. 3.a 5.12=telescope bracket
5.12.1=tilt joint
5.13=sail foil roll
5.13.1=turn motor (on End of bracket)
5.13.2=roll-holder
5.13.3=roll motor (inside of roll)

Reference Signs for FIG. 3.d 5.12=telescope bracket
5.12.3=telescope bracket segments
5.12.4=locking sleeve
5.12.4.1=locking pins
5.12.4.2=locking spring
5.12.4.3=ball bearing guide way
5.12.4.4=pull out lock

SUMMARY OF THE INVENTION

With this patent application under chapter A), a primary fuel less steerage and attitude control system (ACS) for a solar sail has been upgraded, which allows attitude control through furling and unfurling (roller reefing) of sail foils and center of mass displacement by moving daughter units and payload, combined with. The ACS can be used in prior art Thruster-Ring-Solar Sails as well as in the self extending solar sail mothership, which additionally is introduced in this paper.

Under chapter B) a launch system is described in detail which allows a direct launch of a solar sail which is in operation mode, without the need of assembly in space. The system sail expands with the help of the launcher. In contrast to actual designs of self deploying solar sails, the self deploying solar sail shown here, is able to carry a docking station for docking able daughter units as well as ample solar cell arrays which are already mounted in operation ready state. They don't have to be unfolded or expanded anymore through radical exploitation of the full launcher area. The docked in daughter units could be expanded spacecraft, satellites, lander or autonomic add-on thruster units.

What is claimed is:

1. A solar sail launch system comprising a thruster-powered solar sail mothership spacecraft in combination with a launch vehicle, the solar sail mothership spacecraft comprising:
   a ring structure of connected rings,
   a plurality of telescoping masts each having a pivotal attachment at a first end to said ring structure and each pivotally supporting at a second end a sail foil roll with sail foil furled onto the roll;
   the launch vehicle comprising:
   a payload compartment and a rotatable platform,
   the payload compartment being defined by a plurality of petal segments corresponding in number to the number of said telescoping masts of the solar sail mothership spacecraft, and so mounted that said petal segments can be pivoted to open the payload compartment;
   wherein the solar sail mothership spacecraft is contained in a stowed condition within the payload compartment with said ring structure mounted on the rotatable platform and with the telescoping masts in a retracted condition;
   the solar sail launch system further comprising:
   a pivoting mechanism for pivoting said petal segments, whereby each petal segment is configured to pull a corresponding one of said telescoping masts from a stowed position to a deployed position by pivoting the telescoping mast about said pivotal attachment to said ring structure, said telescoping masts all lying substantially in a common plane in their deployed positions;
   means for telescoping each of said telescoping masts from said retracted condition to an extended condition;
   means for pivoting each of said sail foil rolls about said second end of the respective telescoping mast to an operational position in which the sail foil is unfurled from said sail foil roll, whereby said sail foil roll extends transversely relative to the respective telescoping mast;
   means for detaching said solar sail mothership spacecraft from said launch vehicle; and
   means for selectively unfurling and reefing said sail foils on said sail foil rolls to enable the attitude and thrust vector of the solar sail mothership spacecraft to be controlled by the effects of solar radiation pressure impinging on and deflecting off of the sail foils and the center of mass shift caused by the furling and unfurling of the sail foils.

2. The solar sail launch system of claim 1, wherein the ring structure comprises a first plurality of connected rings arranged in a spaced-apart orientation and connected by frame elements, said first plurality of connected rings defining a cylindrical volume which encloses a plurality daughter units and a payload, said daughter units and payload being attached to the ring structure by fastening means consisting of docking brackets and winch devices, wherein the cylindrical volume is configured as a docking station,
   the ring structure further comprising a second plurality of connected rings encircling said cylindrical volume such that the second plurality of connected rings is co-axial to the first plurality of connected rings, said second plurality of connected rings lying in a common plane, wherein thruster units and solar cell arrays are attached to said second plurality of connected rings.

3. The solar sail launch system of claim 2, wherein said docking brackets are configured to allow movement of said daughter units relative to said docking station for attitude control and steering, and wherein said winch devices are configured to move said payload relative to said docking station for attitude control and steering.

4. The solar sail launch system of claim 2, wherein the solar sail mothership spacecraft is equipped with a plurality of thruster pairs which are mounted in a shared jet tube to the second plurality of connected rings, whereby each thruster pair comprises thrusters oriented to provide thrust in opposite directions, thereby enabling the solar sail mothership spacecraft to steer, move, and also reverse thrust directions by switching to the opposite thrusting thrusters.

5. The solar sail launch system of claim 1, wherein said pivoting mechanism for pivoting said petal segments comprises a plurality of sail foil roll winches, each of which is mounted on a respective one of said petal segments and incorporates a line connected to a respective one of said sail foil rolls, whereby each sail foil roll winch can effect said pivoting of said respective sail foil roll to its operational position, said sail foil rolls each further comprising a snap-in mechanism being provided to lock each said sail foil roll into said operational position.

6. The solar sail launch system of claim 5, wherein the lines of said sail foil roll winches comprise predetermined breaking points, whereby said lines can be broken by the forces exerted by the sail foil roll winches once said sail foil rolls have been locked into said operational position.

7. The solar sail launch system of claim 1, wherein said ring structure is releaseably secured to said rotatable platform by means of holding damps, and wherein said telescoping masts each comprise nested telescoping sections comprising spring-biased locking pin assemblies, and wherein means for rotating said rotatable platform cause rotation of said platform, whereby centrifugal forces are generated through rotation which pull said telescoping masts into their extended conditions in which each nested mast section can be locked by the action of said spring-biased locking pins.

8. The solar sail launch system of claim 7, wherein each spring-biased locking pin assembly comprises a spring located in an open-ended sleeve extending transversely to one section of a telescoping mast, and the spring acts on a respective pair of locking pins, each pin extending from a respective end of the sleeve, to an adjacent section of the telescoping mast within which said nested section slides, the outer mast segment being provided with holes in which the pins pressing outwards from the nested section can engage when said nested mast section is stopped in said extended condition at a pullout lock which is attached to the end of each outer segment.

9. The solar sail launch system of claim 1, wherein each sail foil roll is provided with motors for rotating the roll about its own axis.

10. The solar sail launch system of claim 1, wherein each sail foil roll is provided with a motor for rotating said roll of sail foil about the axis of the telescoping mast upon which it is supported.

11. The solar sail launch system of claim 1, wherein of said sail foils two different sail foil types exist, the regular sail foils, which are consisting of a foil segment only and the steering sail foils, said steering sail foils each comprise a foil segment at a proximal end and a ballast segment at a distal end with respect to said plurality of connected rings, wherein said ballast segments are made of a material that is heavier and thicker than the foil segments, wherein said steering sail foils are arranged in steering pairs such that the two steering sail foils of a steering pair are located at opposite sides with respect to the second plurality of connected rings, said means for selectively unfurling and reefing said sail foils of the solar sail mothership spacecraft being capable of moving the center of mass of the solar sail mothership spacecraft by selectively unfurling and reefing the sail foils of said steering pairs.

12. The solar sail launch system of claim 11, wherein the selective unfurling and reefing of the solar sails changes the center of solar radiation pressure of the solar sail mothership spacecraft, and wherein the solar sail mothership spacecraft is steered by changing the center of mass relative to the center of solar radiation pressure, the center of mass being changed by selectively unfurling and reefing said sail foils comprising said ballast segments and by moving said daughter units and payload relative to the ring structure.

* * * * *